United States Patent [19]
Alleau et al.

[11] 4,094,147
[45] June 13, 1978

[54] CIRCUIT FOR THE SUPPLY OF CONDENSABLE FLUID TO A SOLAR ENGINE

[75] Inventors: Thierry Alleau, Saint-Ismier; Robert Moracchioli, Grenoble, both of France

[73] Assignee: Commissariat a l'Energie Atomique, Paris, France

[21] Appl. No.: 775,476

[22] Filed: Mar. 8, 1977

[30] Foreign Application Priority Data

Mar. 11, 1976 France .................. 76 07005

[51] Int. Cl.² .................. F03G 7/02; F01K 3/00
[52] U.S. Cl. .................. 60/641; 60/646; 60/656; 60/657
[58] Field of Search .......... 60/646, 647, 656, 657, 60/641, 676; 126/270, 271

[56] References Cited

U.S. PATENT DOCUMENTS

| 2,969,637 | 1/1961 | Rowekamp | 60/641 |
| 3,845,628 | 11/1974 | Bronicki | 60/656 |

*Primary Examiner*—Allen M. Ostrager
*Attorney, Agent, or Firm*—Cameron, Kerkam, Sutton, Stowell & Stowell

[57] ABSTRACT

In the improved supply circuit, provision is made for a "start-up" storage tank placed at a higher level than the heat exchanger and connected to a secondary circuit in portion of this latter which is located between the solar engine and the feed pump and includes the evaporator. The storage tank is equipped with heating means for bringing the fluid contained therein to a temperature which is lower than the temperature of the fluid within the evaporator.

3 Claims, 2 Drawing Figures

CIRCUIT FOR THE SUPPLY OF CONDENSABLE FLUID TO A SOLAR ENGINE

This invention relates to an improved circuit for the supply of condensable fluid to a solar engine.

In more exact terms, the present invention is concerned with an additional element of said circuit which permits start-up of the solar engine when the supply circuit of said engine comprises a thin-film evaporator.

It is known that the special devices referred-to as solar engines are actuated by the expansion of a fluid which is vaporized under pressure within a system of the type providing a small temperature difference. In installations of this type, a primary fluid heated by a bank of solar heat collectors exchanges its heat within an evaporator with a condensable fluid which is supplied to the engine. The engine operates between a hot source constituted by the evaporator and a cold source constituted by a condenser.

Figure 1:
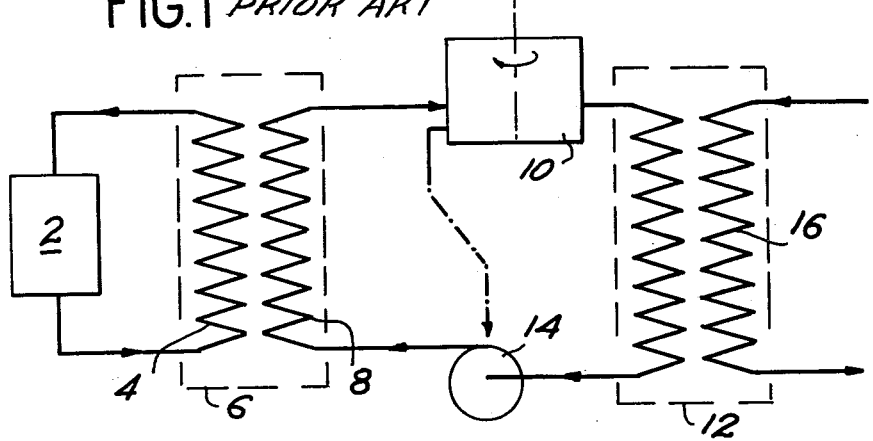

A simplified diagram of a solar engine supply circuit is illustrated in FIG. 1. There is first shown a primary circuit supplied for example with hot water which essentially comprises a bank 2 of solar collectors and the primary portion 4 of a heat exchanger 6 which will hereinafter be designated as an evaporator.

The supply circuit proper is constituted by a secondary circuit supplied with a condensable fluid which may or may not be a chlorofluorinated hydrocarbon, for example. This circuit essentially comprises the secondary portion 8 of the evaporator 6 and a solar engine 10 which is supplied with said condensable fluid and the outlet of which is connected to the inlet of a condenser 12. As it passes out of the condenser, the secondary fluid is set in motion and brought to the pressure of the evaporator by a feed pump 14, the outlet of which is connected to the inlet of the secondary portion 8 of the evaporator. The condenser 12 is supplied with cold water by the circuit 16. The feed pump 14 is coupled with the engine 10.

In the case in which the evaporator 6 is a conventional evaporator of the tube type having a high capacity on the secondary circuit side, it is readily apparent that, when the installation is started up, the evaporator 6 behaves as a boiler under the action of the heat supplied by the primary liquid which is heated by the bank 2 of solar collectors. Vaporization of the secondary fluid within the secondary portion 8 of the evaporator supplies the engine which in turn drives the feed pump 14. This has the effect of supplying fluid to the evaporator 6 and therefore progressively ensures normal operation of the engine 10.

However, this type of evaporator has a disadvantage in that, under the conditions of use of solar engines, temperature differences of 4° to 5° C between the primary fluid (hot water) and the vaporized secondary fluid (butane or Freon) must be tolerated in order to limit the heat-transfer surfaces to reasonable values both from the point of view of manufacturing cost and from the point of view of size of units of this type. For this reason, preference is given to the use of the so-called thin-film heat exchangers such as those described in French patent application No. 76 03875 of Feb. 12, 1976 in respect of "A thin-film heat exchanger" filed in the name of the present Applicant.

Thin-film heat exchangers of the type developed by the present Applicant have the advantage of performances which are two to three times higher than those of tube evaporators of the conventional type.

However, the rate of flow of secondary fluid is of a low order in the case of thin-film heat exchangers, with the result that these latter are in a practically dry condition, particularly at the moment of restarting of the installation after a period of shutdown.

The precise object of the present invention is to provide an improved circuit for the supply of a solar engine which permits easy start-up of the engine when making use of thin-film heat exchangers of the type described in the patent Application cited above or when employing tube-type exchangers which have a low capacity on the secondary side.

Said improved circuit for the supply of condensable fluid to a solar engine is of the type comprising a primary circuit in which a first liquid is circulated and comprising a solar collector and an evaporator and a secondary circuit in which a condensable fluid is circulated. Said secondary circuit includes said evaporator and the outlet of this latter supplies a solar engine which is in turn coupled with a condenser, the outlet of said condenser being connected by means of a re-supply pump to the inlet of the secondary circuit of said evaporator, said re-supply pump being coupled with said engine. Said supply circuit essentially comprises a so-called "start-up" storage tank located at a higher level than said heat exchanger and connected by means of a pipe to said secondary circuit at a point located in that portion of said circuit which is placed between said engine and said pump and includes the evaporator.

In accordance with a first characteristic feature, the storage tank is provided with means for bringing the secondary fluid contained therein to a temperature below the temperature of the fluid within the evaporator.

In accordance with another characteristic feature, the means aforesaid are constituted by a portion of the primary circuit.

In accordance with yet another characteristic feature, the outlet of the primary circuit of the evaporator is connected to the inlet of a system for heating said storage tank.

Preferably, the pipe for connecting the storage tank to the secondary circuit serves to connect the bottom of said storage tank to a point of the secondary circuit located between the feed pump and the inlet of the evaporator.

Figure 2:
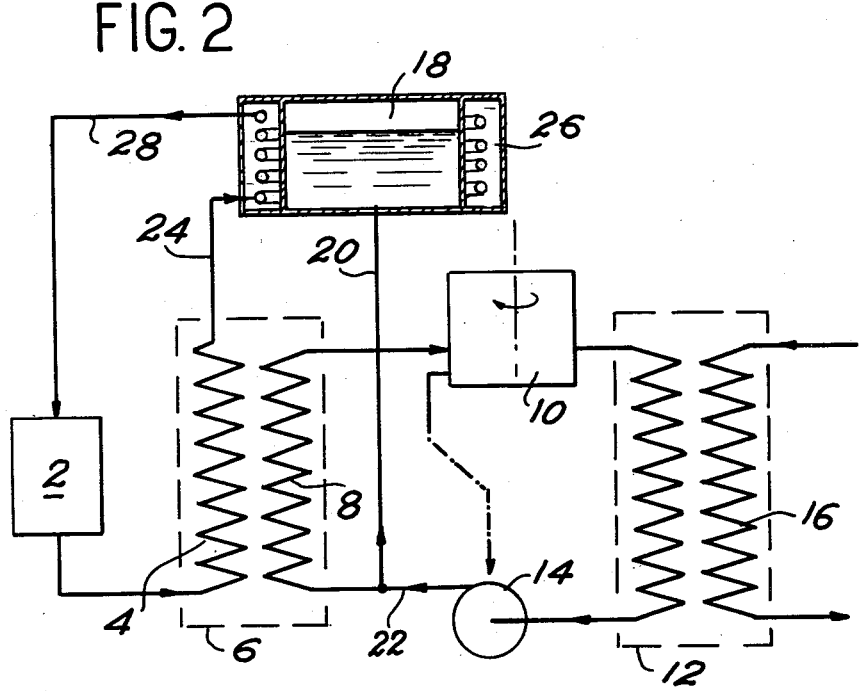

A more complete understanding of the invention will in any case be obtained from the following description of one embodiment of the invention which is given by way of example and not in any limiting sense, and in which:

FIG. 1 which has already been described in the foregoing shows a circuit of known type for the supply of a solar engine;

FIG. 2 is a diagram of a circuit in accordance with the invention embodying the improvement which provides for assisted start-up of the solar engine.

FIG. 2 shows the improved circuit for supplying the solar engine. It is apparent that, in this circuit, most of the elements which have already been described in connection with FIG. 1 are again shown and will therefore not be described further. The same references have of course been given to the same elements in both figures. In more precise terms, the secondary circuit of FIG. 2 is identical with the secondary circuit of FIG. 1, the only difference being that the evaporator 6 is an evaporator having low capacity on the secondary side and is of the thin-film type, for example, as described and claimed in French patent application No. 76 03875.

In addition to the description already given, the secondary circuit further comprises a so-called "start-up" storage tank 18 which is placed at a higher level than the evaporator 6. The bottom of this storage tank is connected by means of a pipe 20 to the pipe 22 of the secondary circuit which provides a connection between the outlet of the feed pump 14 and the inlet of the secondary portion 8 of the evaporator 6. More generally, the lower end of the pipe 20 could be connected to any portion of the secondary circuit which is located between the motor 10 and the pump 14 and contains the evaporator 6.

In accordance with a preferred embodiment, the start-up storage tank 18 is equipped with means for heating the secondary fluid contained therein to a temperature below the temperature of the fluid within the evaporator during normal operation. Under these conditions of heating, the secondary fluid is stored in liquid form in the tank 18.

Preferably, the means for heating the liquid contained in the storage tank 18 involve a modification of the primary supply circuit as shown in FIG. 2. At the outlet of the primary portion of the evaporator which is designated by the reference 4, a pipe 24 connects the evaporator to heating coils 26 which are located within the storage tank 18 and in which the primary fluid is circulated (as a general rule, said primary fluid consists of hot water). At the outlet of said heating coils, the hot water returns to the bank of solar collectors through the pipe 28.

In view of the fact that, in the first place, the water employed for heating the storage tank 18 passes out of the evaporator and has thus already released part of its heat and that, in the second place, the coefficient of heat transfer between the water and the secondary liquid contained in the tank 18 is distinctly lower than the coefficient of heat transfer between the primary liquid and the secondary fluid within the evaporator, the liquid contained in the tank 18 is at an appreciably lower temperature than that of the same fluid within the evaporator during normal operation.

Taking into account the temperature differences, the equilibrium pressure of the fluid within the storage tank is lower than that which exists within the thin-film evaporator.

During the period of normal operation of the installation, filling of the storage tank is accordingly achieved.

The primary fluid is circulated through the coil 26 to maintain the fluid in the storage tank at a temperature which is lower than the one of the fluid in the secondary portion of the evaporator. Consequently, the fluid in the storage tank is cooled a little by the primary fluid circulating in the coil. In consequence, the primary fluid is slightly heated. The purpose of the coil is not to heat the primary fluid but to cool the fluid within the tank.

Pipe 20 is permanently connected to the secondary circuit. Since there is a difference between the temperature of the storage tank and of the secondary circuit, there is probably an upstream and downstream circulation of fluid through the pipe 20, but on the average a constant quantity of liquid is maintained in the storage tank during the normal operation of the circuit. This average state is the only important aspect.

At the time of shutdown of the installation and by reason of the position of the storage tank with respect to the evaporator, the liquid contained in the tank is emptied into the evaporator under the action of gravity. This discharge is facilitated on the one hand by the progressive equilibrium of temperatures and on the other hand by a reduction of pressure within the thin-film heat exchanger to zero, this being due to the absence of supply of the heat exchanger and to leakage from the valves which are not completely leak-tight. During the stage of start-up of the engine after a period of shutdown, the thin-film evaporator which is partly filled with the liquid discharged from the storage tank behaves as a boiler and can accordingly supply steam to the engine. In consequence, the engine will be set in motion in the normal manner and drives the feed pump. When normal operating conditions are attained, the thin-film heat exchanger is restored to normal operation as described in the patent Application cited earlier. In that case, the start-up storage tank is progressively filled, with the result that it is in a condition of readiness to assist the following start-up.

It is therefore apparent that this modification of the secondary circuit for the supply of the solar engine on the one hand makes it possible to start-up the engine under good conditions when employing a heat exchanger of the thin-film type or of the type which has a low capacity on the secondary side and, on the other hand, does not entail the need for any complicated installation. By way of example, the start-up reservoir can have a capacity of the order of a few liters, which does not appreciably modify the capacity of the installation obtained, this being largely due to the use of a thin-film evaporator.

What we claim is:

1. An improved circuit for the supply of a condensable fluid to a solar engine comprising a primary circuit in which a first liquid is circulated, and comprising at least one solar collector and an evaporator having primary and secondary portions and a secondary circuit in which a condensable fluid is circulated, said secondary circuit including the secondary portion of said evaporator, an oulet for said evaporator supplying a solar engine coupled with a condenser, an oulet for said condenser connected by a re-supply pump to an inlet of said secondary portion of said evaporator, said re-supply pump being coupled with said engine, wherein said secondary circuit comprises a start-up storage tank located at a higher level than said evaporator and connected by a pipe to said secondary circuit at a point in said secondary circuit between said engine and said pump and including said secondary portion of said evaporator, and regulating means for said storage tank for bringing the fluid therein to a temperature lower than the temperature of the condensable fluid within said evaporator.

2. A circuit according to claim 1, wherein said regulating means includes a coil surrounding said storage tank, an inlet and an outlet for said coil, said inlet being connected to an outlet of said primary portion of said evaporator, said outlet being connected to said solar collector, said coil being a part of said primary circuit.

3. A circuit according to claim 1, including a bottom for said storage tank and said pipe connecting said bottom of said storage tank with a point of said secondary circuit between said re-supply pump, and said inlet of said secondary portion of said evaporator.

* * * * *